(12) United States Patent
Cho et al.

(10) Patent No.: US 9,098,388 B2
(45) Date of Patent: Aug. 4, 2015

(54) APPARATUS AND METHOD FOR RECORDING AN IMAGE FOR A VEHICLE USING ON BOARD DIAGNOSTIC INFORMATION

(71) Applicant: Samsung Electronics Co., Ltd., Gyeonggi-do (KR)

(72) Inventors: Hyun-Wook Cho, Gyeonggi-do (KR); Young-Chool Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 40 days.

(21) Appl. No.: 13/782,588

(22) Filed: Mar. 1, 2013

(65) Prior Publication Data

US 2013/0261880 A1    Oct. 3, 2013

(30) Foreign Application Priority Data

Mar. 28, 2012  (KR) .......................... 10-2012-0031684

(51) Int. Cl.
*G06F 17/00* (2006.01)
*G07C 5/08* (2006.01)

(52) U.S. Cl.
CPC .............. *G06F 17/00* (2013.01); *G07C 5/0866* (2013.01)

(58) Field of Classification Search
CPC .................................. G06F 17/00; G07F 17/00
USPC .......................................................... 701/32.4
See application file for complete search history.

(56) References Cited

U.S. PATENT DOCUMENTS

2011/0066317 A1*  3/2011  Lee ................................. 701/33

* cited by examiner

*Primary Examiner* — Mary Cheung
*Assistant Examiner* — Yuen Wong
(74) *Attorney, Agent, or Firm* — The Farrell Law Firm, P.C.

(57) ABSTRACT

An apparatus and method for recording an image from a vehicle using On Board Diagnostic (OBD) information are provided. A vehicle state information acquirer receives state information about a devices loaded on the vehicle and an OBD terminal provided in the vehicle. A sensor unit senses movement of the vehicle. An image input unit captures images related to vehicle driving. A controller senses a value that is greater than or equal to a predetermined threshold received from the sensor unit or receives vehicle state information related to an occurrence of an event is received from the OBD terminal, starts capturing the images through the image input unit, and controls storing of the captured images with the vehicle state information. A memory that stores the captured images with the vehicle state information.

15 Claims, 4 Drawing Sheets

APPARATUS AND METHOD FOR RECORDING AN IMAGE FOR A VEHICLE USING ON BOARD DIAGNOSTIC INFORMATION

PRIORITY

This application claims priority under 35 U.S.C. §119(a) to Korean Patent Application Serial No. 10-2012-0031684, which was filed in the Korean Intellectual Property Office on Mar. 28, 2012, the entire of disclosure of which is incorporated herein by reference.

BACKGROUND OF THE INVENTION

1. Field of the Invention

The present invention relates generally to an apparatus and method for recording images for a vehicle, and more particularly, to an apparatus and method for recording images for a vehicle using On Board Diagnostic (OBD) information.

2. Description of the Related Art

Black boxes are used in aircrafts and in other vehicles such as cars. The vehicle black box records information about driving states and accidents for use in accurate assessments of vehicle accident conditions.

With the increasing popularity of mobile terminals, such as smart phones or tablet Personal Computers (PCs), navigation software and/or black box software in the mobile terminals is being substituted for conventional vehicle navigators or black boxes.

Generally, black box software loaded on a mobile terminal supports continuous video recording or event-triggered video recording. In a continuous video recording scheme, once the black box function is started, video is continuously recorded, regardless of whether an event occurs, and if the video recording exceeds a limited memory capacity of the mobile terminal, old images are overwritten with new ones. In an event-triggered video recording scheme, only when an event is sensed, i.e., when a gyro sensor installed on the mobile terminal senses a vehicle collision, a video is recorded.

Because old images are erased in time order when the limited memory capacity is exceeded in a conventional mobile terminal, images recorded during a vehicle accident may be overwritten in the continuous video recording scheme.

Further, although images are not erased in the event-triggered video recording scheme, this recording scheme depends entirely on sensed results of the gyro sensor, with no regard to a number of vehicle states or conditions. Further, images captured in relation to an event, i.e., event images, are stored in a specific memory area. However, if events occur often, certain event images may not be recorded because of the limited capacity of the specific memory area.

SUMMARY OF THE INVENTION

The present invention is designed to address at least the above-described problems and/or disadvantages, and to provide at least the advantages described below.

Accordingly, an aspect of the present invention is to provide an apparatus and method for recording images, upon occurrence of an event while driving.

Another aspect of the present invention is to provide an apparatus and method for recording images and vehicle driving information, when an event occurs while driving.

Another aspect of the present invention is to provide an apparatus and method for efficiently recording event images by changing an event determination criterion according to sensor measurement information.

In accordance with an embodiment of the present invention, an apparatus is provided for recording an image for a vehicle using OBD information. The apparatus includes a vehicle state information acquirer that receives state information about a devices loaded on the vehicle and an OBD terminal provided in the vehicle; a sensor unit that senses movement of the vehicle; an image input unit that captures images related to vehicle driving; a controller that senses a value that is greater than or equal to a predetermined threshold received from the sensor unit or receives vehicle state information related to an occurrence of an event is received from the OBD terminal, starts capturing the images through the image input unit, and controls storing of the captured images with the vehicle state information; and a memory that stores the captured images with the vehicle state information.

In accordance with another aspect of the present invention, a method is provided for recording an image for a vehicle using OBD information at a mobile terminal. The method includes capturing an interior or exterior image of the vehicle including the mobile terminal, upon execution of a black box application installed in the mobile terminal; determining whether an event has occurred to the vehicle; and storing an image related to the event with vehicle state information received from an OBD terminal provided in the vehicle, upon an occurrence of the event.

In accordance with another aspect of the present invention, an apparatus is provided for recording an image for a vehicle using OBD information. The apparatus includes a vehicle state information acquirer that receives state information about a device loaded on the vehicle and an OBD terminal provided in the vehicle; a sensor unit that outputs sensed information about at least one of vehicle a shaking and an inter-vehicle distance of the vehicle; an image input unit that captures images related to vehicle driving; a controller that receives vehicle state information related to an occurrence of an event from the OBD terminal, generates a condition based on the sensed information received from the sensor unit to adjust an event occurrence criterion of the OBD terminal, notifies the OBD terminal of the condition, and controls storing of an event image received through the image input unit; and a memory that stores the event image with the vehicle state information.

In accordance with another embodiment of the present invention, a method is provided for recording an image for a vehicle using OBD information. The method includes capturing an interior or an exterior image of the vehicle including a mobile terminal, upon execution of a black box application installed in the mobile terminal; receiving vehicle state information related to an event occurring at a device loaded on the vehicle from an OBD terminal provided in the vehicle; acquiring sensed information about at least one of a vehicle shaking and an inter-vehicle distance of the vehicle; generating a condition based on the sensed information received from a sensor unit to adjust an event occurrence criterion of the OBD terminal; notifying the OBD terminal of the condition; and storing a captured event image with the vehicle state information.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In accordance with an embodiment of the present invention, a method is provided for recording images from a vehicle upon an occurrence of an event while driving. In the vehicle, a vehicle state information acquirer receives state information about one or more devices loaded on a vehicle in conjunction with an OBD terminal provided in the vehicle, a sensor unit senses movement of the vehicle in which a mobile terminal is cradled, an image input unit outputs images according to vehicle driving, and a controller starts image recording at the image input unit and stores the recorded images together with the state information, when a sensed value that is greater than or equal to a predetermined threshold is received from the sensor unit or state information related with occurrence of an event is received from the OBD terminal. Therefore, when a vehicle event, such as a fast acceleration, a fast deceleration, an engine overheating, etc. occurs, images are stored together with information about a vehicle state at the moment of the event and a user is provided with the event images and the vehicle state information. Consequently, the user can more accurately assess a vehicle state.

Figure 1:
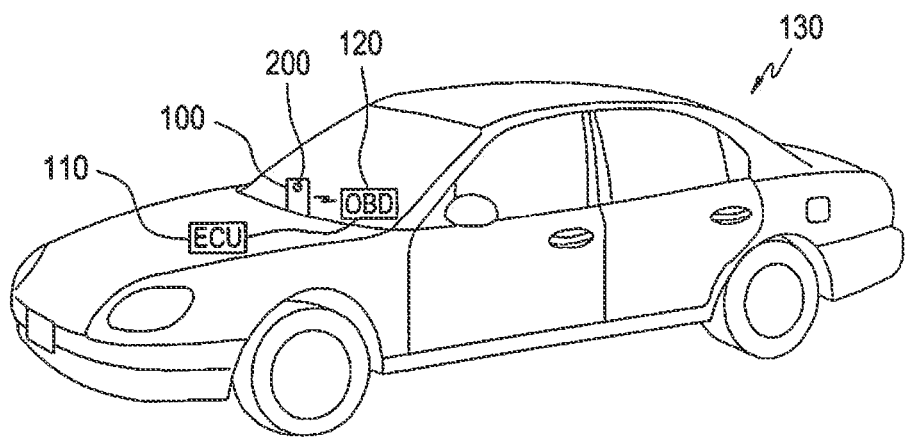
FIG. 1 illustrates a vehicle including a mobile terminal equipped with a black box function according to an embodiment of the present invention.

FIG. 1 illustrates a vehicle including a mobile terminal equipped with a black box function according to an embodiment of the present invention.

Referring to FIG. 1, a mobile terminal 100 including an image input unit 200, e.g., a camera, is detachably cradled in a vehicle 130 in order to capture an interior field of view or an exterior field of view of the vehicle 130. The mobile terminal 100 receives vehicle state information from an OBD terminal 120, e.g., through a connector or by short-range wireless communication. For example, the short-range wireless communication may be conducted using Bluetooth, Wireless Fidelity (WiFi), etc.

The OBD terminal 120 also receives state information about at least one device loaded on the vehicle 130 from an Engine Control Unit (ECU) 110.

OBD is a term mainly used in the vehicle industry. Newer manufactured vehicles are equipped with sensors for various measurements and controls, e.g., a temperature sensor, a pressure sensor, an acceleration sensor, etc. These sensors are controlled by the ECU 110. An ECU was originally designed to control core functions of an engine such as ignition timing, fuel injection, variable valve timing, engine idling, and threshold setting. However, due to improvements in vehicle and computer performance, the ECU 110 can now also control every part of a vehicle including driving, fuel supply, and steering systems, as well as perform automatic transmission control.

Therefore, the OBD 120 terminal notifies of information about main systems of the vehicle 130 or defects, as output from at least one device installed on the vehicle 130, i.e., sensors to the ECU 110, thereby enabling self-diagnosis of the vehicle 130. For example, the information received from the ECU 110 specifies a time, a distance, a speed, a Revolutions Per Minute (RPM), a gas mileage, a battery voltage, coolant exchange, an idling time, etc.

According to an embodiment of the present invention, the mobile terminal 100 records images, upon an occurrence of an event, by checking various vehicle states or driving conditions based on information received from the OBD terminal 120. The images are stored together with the information received from the OBD terminal 120. As accident images, and driving or speed information during an accident are stored, the composite vehicle information may be helpful in analyzing a cause of the accident.

Figure 2:
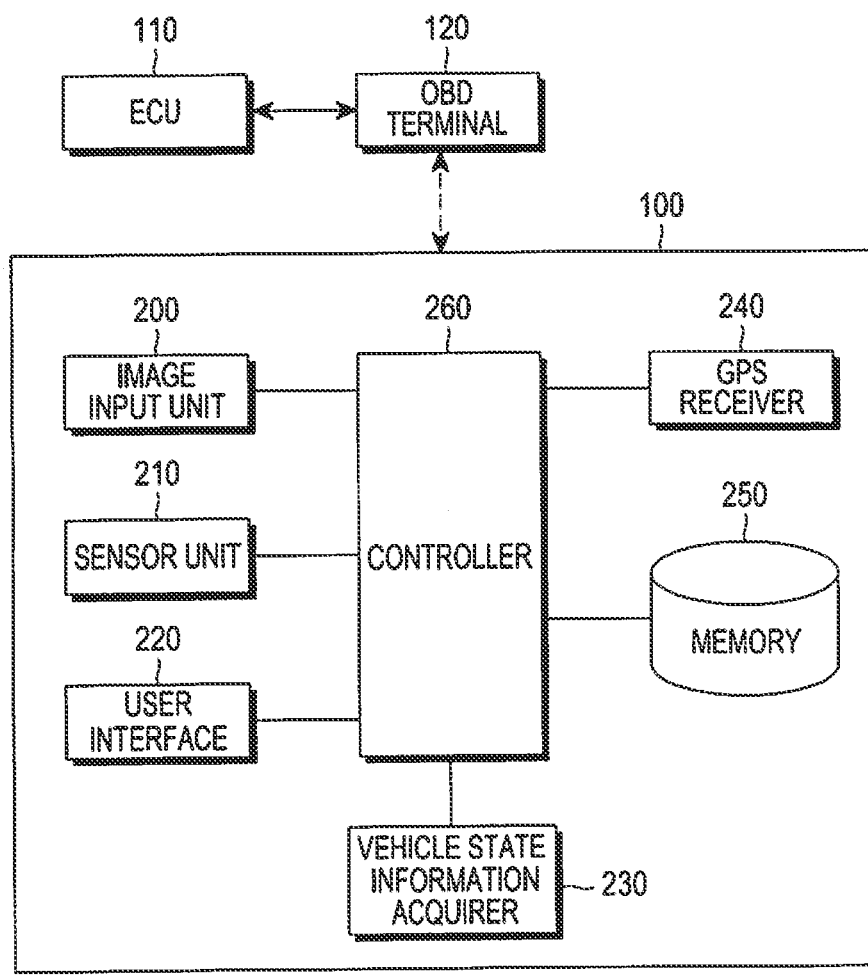
FIG. 2 is a block diagram of a mobile terminal according to an embodiment of the present invention.

FIG. 2 is a block diagram of a mobile terminal according to an embodiment of the present invention.

Referring to FIG. 2, the mobile terminal 100 includes the image input unit 200, a sensor unit 210, a user interface 220, a vehicle state information acquirer 230, a Global Positioning System (GPS) receiver 240, a memory 250, and a controller 260.

The image input unit 200 generates an image signal corresponding to an input external image. For example, the image input unit 200 is a camera. When the mobile terminal 100 is cradled in the vehicle 130, the image input unit 200 captures images of driving conditions and the interior and/or exterior of the vehicle 130.

The sensor unit 210 senses the speed, shock, vibration, direction, and inter-vehicle distance of the vehicle 130 in which the mobile terminal 100 is placed. For example, the sensor unit 210 includes, but not limited to, an inertial sensor such as an accelerometer, a gyroscope, a shock sensor, a tilt sensor, etc., an altimeter, a gravity sensor, and a geomagnetic sensor, alone or in combination. The sensor unit 210 may also be configured with any other type of sensor that can sense movement of the vehicle 130 having the mobile terminal 100. The controller 260 receives a sensed value or sensed data from the sensor unit 210 and compares the sensed value or sensed data with a threshold being a criterion for detecting an event.

The user interface 220 may be configured with a Liquid Crystal Display (LCD) panel. If the LCD panel is implemented into a touch screen, the user interface 220 is used as an input device as well as a display device. The user interface 220 displays user-input information or information to be provided to the user as well as menus. According to an embodiment of the present invention, the user interface 220 outputs images and vehicle state information that are recorded upon an occurrence of a vehicle event.

The vehicle state information acquirer 230 receives vehicle state information such as a fast acceleration, a fast deceleration, an engine overheating, an ECU defect, speed, RPM, a brake signal, an accelerator state, transmission information, etc., from the OBD terminal 120. The vehicle state information further includes a vehicle defect code for checking whether there is a defect in the engine system and transmission system of the vehicle 130. When the user executes an OBD application, the vehicle state information acquirer 230 is paired with the OBD terminal 120 and communicates with the OBD terminal 120, e.g., by short-range wireless communication. Alternatively or additionally, the vehicle state information acquirer 230 may communicate with the OBD terminal 120 via a direct connection.

The vehicle state information acquirer 230 requests vehicle state information from the OBD terminal 120 under the control of the controller 260. Then the vehicle state information acquirer 230 periodically receives the vehicle state information from the OBD terminal 120. However, the vehicle state information acquirer 230 also receives vehicle state information from the OBD terminal 120 upon an occurrence of an event, such as an abnormal vehicle condition.

The GPS receiver 240 receives GPS information about the vehicle from GPS satellites. The GPS information includes information about a current location and a speed of the vehicle 130 during driving and a current time.

The memory 250, e.g., a Read Only Memory (ROM) and a Random Access Memory (RAM), stores a plurality of programs and information for controlling the operation of the mobile terminal 100. Further, the memory 250 stores data generated and used in the mobile terminal 100. For example, the data includes data generated during execution of an application and data that is generated in the mobile terminal 100 or that is externally received. According to an embodiment of the present invention, the memory 250 stores an OBD application for communication with the OBD terminal 120, and a black box application.

Images that are captured through activation of the black box application are temporarily buffered in a buffer of the memory 250. The buffer has a large enough capacity to store images of a predetermined size. After images are captured, the buffer temporarily buffers as many images as its capacity. Upon occurrence of a vehicle event, the buffered images are stored in a non-erasable area of the memory 250. The memory 250 includes a continuous image recording area and an event image recording area. Images captured when the black box application is executed are stored in the continuous image recording area.

Pre-event and post-event images each having a predetermined size are stored, with respect to an event occurrence time. Accordingly, the memory 250 permanently stores event images.

It is preferred to record event images with priority because they may be captured in the event of an accident. Therefore, there exists a need for a method for recording event images despite lack of an event image recording area.

According to an embodiment of the present invention, if the remaining capacity of the event image recording area decreases to or below a threshold in the memory 250 during storing event images, a predetermined amount of the capacity of the continuous image recording area is allocated for recording event images. That is, the continuous image recording area and the event image recording area of the memory 250 are adaptively changed under the control of the controller 260. Consequently, lack of the event image recording area can be prevented.

When the OBD application or the black box application is activated, the controller 260 controls the image input unit 200 to start to capture images. In accordance with an embodiment of the present invention, the controller 260 determines whether a sensed value received from the sensor unit 210 is greater than or equal to a predetermined threshold. The predetermined threshold is a criterion used to determine whether a vehicle event has occurred, such as a collision, fast braking, sliding, rollover, rotation, etc.

If the sensed value is greater than or equal to the predetermined threshold, the controller 260 determines that an event has occurred and stores images of a predetermined size with respect to the time of the event. The images include still images, a video, etc., that are captured before and after the event occurrence time by the image input unit 200 facing the interior and/or exterior of the vehicle. The controller 260 additionally stores vehicle state information received from the OBD terminal 120 and location information received from the GPS receiver 240 in the memory 250. The composite vehicle information stored together with the images may then be used in identifying a cause of the event.

In accordance with another embodiment of the present invention, upon receipt of vehicle state information related to an occurrence of an event from the OBD terminal 120, the controller 260 receives information about a traffic state, vehicle shaking, and an inter-vehicle distance and generates an event determination condition based on the received information. The traffic state information may be about a road condition and a vehicle speed, which may be received from an external server. The vehicle speed may be extracted from GPS information received from the GPS receiver 240. The vehicle shaking and the inter-vehicle distance may be extracted from sensor information measured by the sensor unit 210.

The event determination condition is a threshold at which the OBD terminal 120 determines that an event has occurred. For instance, if the vehicle state information indicates a fast deceleration, this may imply that the vehicle has collided or is about to collide with another vehicle. Therefore, upon receipt of the vehicle state information, the controller 260 detects a collision or a near collision situation based on vehicle shaking and an inter-vehicle distance and then determines that an event situation such as an accident or an almost accident has occurred. In this case, the controller 260 changes the event determination condition according to the vehicle shaking, the inter-vehicle distance, and the traffic condition information. Accordingly, the mobile terminal 100 adaptively adjusts an event determination condition according to a current situation and notifies the OBD terminal 120 of the adjusted event determination condition.

Upon an occurrence of an event satisfying an event determination condition, the mobile terminal 100 receives a request for recording event images from the OBD terminal 120. Because the mobile terminal 100 can store event images of an almost accident situation, event image recording is efficient. When the vehicle often decelerates fast while driving on a rugged road, a lot of event images may be stored in conventional technology. In contrast, because an event determination criterion can be adjusted, based on traffic condition information, an inter-vehicle distance, and vehicle shaking, the fast deceleration may not be sensed as an event in the present invention.

Figure 3:
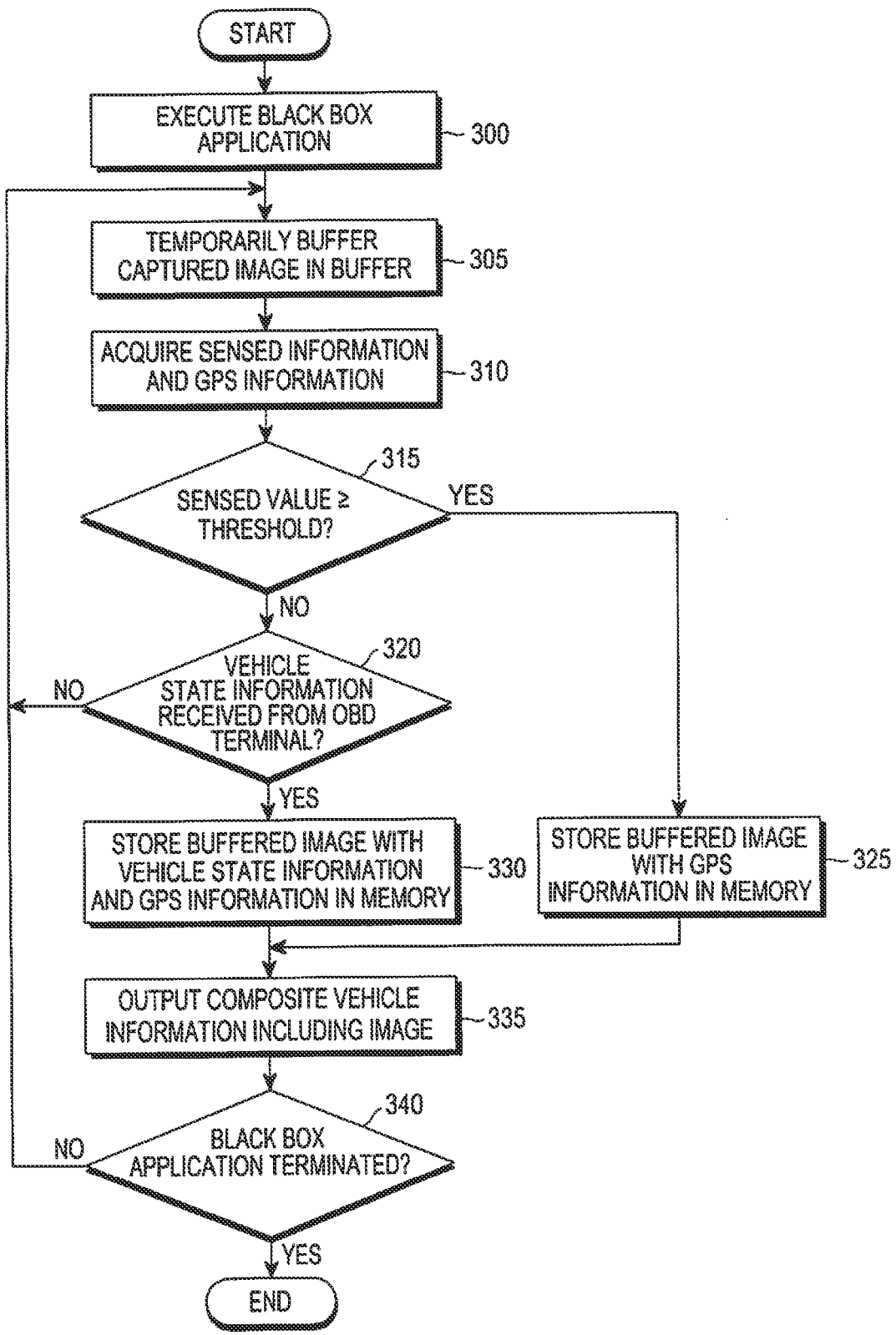
FIG. 3 is a flowchart illustrating an operation for recording images using OBD information at a mobile terminal according to an embodiment of the present invention.

FIG. 3 is a flowchart illustrating an operation for recording images using OBD information at a mobile terminal according to an embodiment of the present invention.

Referring to FIG. 3, when a user executes a black box application, the mobile terminal 100 captures an interior and/or exterior of the vehicle 130 through the image input unit 200 in step 300. In step 305, the captured image is temporarily buffered in the buffer. While capturing the image, in step 310, the mobile terminal 100 senses a value using the sensor unit and acquires GPS information. The GPS information includes location information that specifies the coordinates, bearing, time, speed, and direction of the vehicle.

If the sensed value is greater than or equal to a threshold in step 315, the mobile terminal 100 determines that a vehicle event has occurred and stores the image temporarily buffered in the buffer along with the GPS information in the memory in step 325. However, if the sensed value is smaller than the threshold in step 315, the mobile terminal 100 monitors reception of vehicle state information from the OBD terminal 120 in step 320. If the mobile terminal 100 fails to receive the vehicle state information, the operation returns to step 305. However, upon receipt of the vehicle state information in step 320, the mobile terminal 100 stores the image temporarily buffered in the buffer along with the vehicle state information and the GPS information in the memory in step 330. That is, even though the sensed value is smaller than the threshold, once the mobile terminal 100 receives the vehicle state information from the OBD terminal 120, it determines that a vehicle event has occurred and thus stores the captured image.

Accordingly, images captured for a predetermined time before and/or after the occurrence time of the event are permanently stored. If the vehicle state information is also received, the vehicle state information is stored together with the captured images.

In step 335, the mobile terminal 100 outputs information including the stored images, i.e., composite vehicle information, to the user. Accordingly, when the mobile terminal 100 directly senses a vehicle event or receives vehicle state information from the OBD terminal 120, the mobile terminal 100 provides the user with images captured upon generation of an event, vehicle driving information, traveling route information, etc., as well as the vehicle state information. Unless the black box application is terminated in step 340, the operation returns to step 305 and repeats the above-described operation.

In accordance with another embodiment of the present invention, upon receipt of vehicle state information from the OBD terminal 120, the mobile terminal 100 starts to record an event image, which prevents frequent storing of event images despite a non-event situation.

If a video is recorded based on an additional condition set taking into account a lot of risks or vehicle states that a vehicle may face, video recording may be more efficient. In the case where a threshold being a criterion for determining occurrence of an event is set simply by a user, unnecessary event images may be stored in a non-event situation or no event images may be stored in an event situation. Likewise, when a manufacturer sets the threshold, user-unintended event images may be stored. Accordingly, event image recording can be efficient if the event determination criterion is changed adaptively according to sensor measurement information and thus only optimum event images are stored.

More specifically, when receiving the vehicle state information, the mobile terminal 100 determines vehicle shaking and an inter-vehicle distance, which the user may get when coming close to a real collision, adjusts an event determination condition according to the determined vehicle shaking and inter-vehicle distance, and provides the adjusted event determination condition to the OBD terminal 120 for the OBD terminal 120 to sense an occurrence of an event based on the event determination condition.

Figure 4:
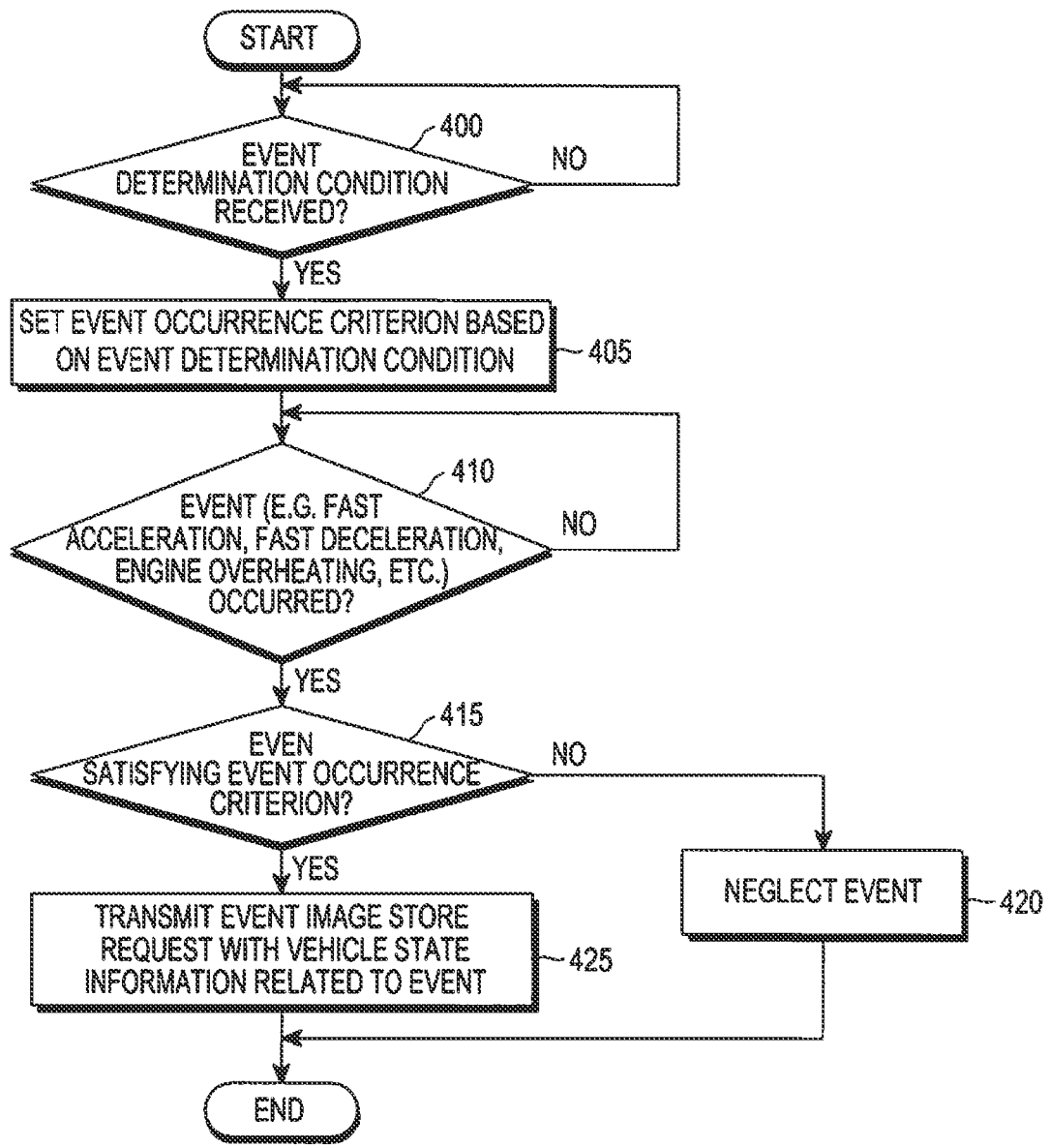
FIG. 4 is a flowchart illustrating an operation of an OBD terminal according to an embodiment of the present invention.

FIG. 4 is a flowchart illustrating an operation of an OBD terminal according to an embodiment of the present invention.

Referring to FIG. 4, upon receipt of an event determination condition from the mobile terminal in step 400, the OBD terminal 120 sets an event occurrence criterion according to the received event determination condition in step 405. That is, the OBD terminal 120 adjusts a criterion by which it determines whether an event has occurred.

Upon occurrence of an event such as a fast acceleration, a fast deceleration, an engine overheating, etc., in step 410, the OBD terminal 120 determines whether the event satisfies the event occurrence criterion in step 415. If the event does not satisfy the event occurrence criterion in step 415, the OBD terminal 120 neglects generated event information in step 420. However, if the event satisfies the event occurrence criterion in step 415, the OBD terminal 120 transmits a request for storing an event image along with vehicle state information related to the event to the mobile terminal 100 in step 425.

Figure 5:
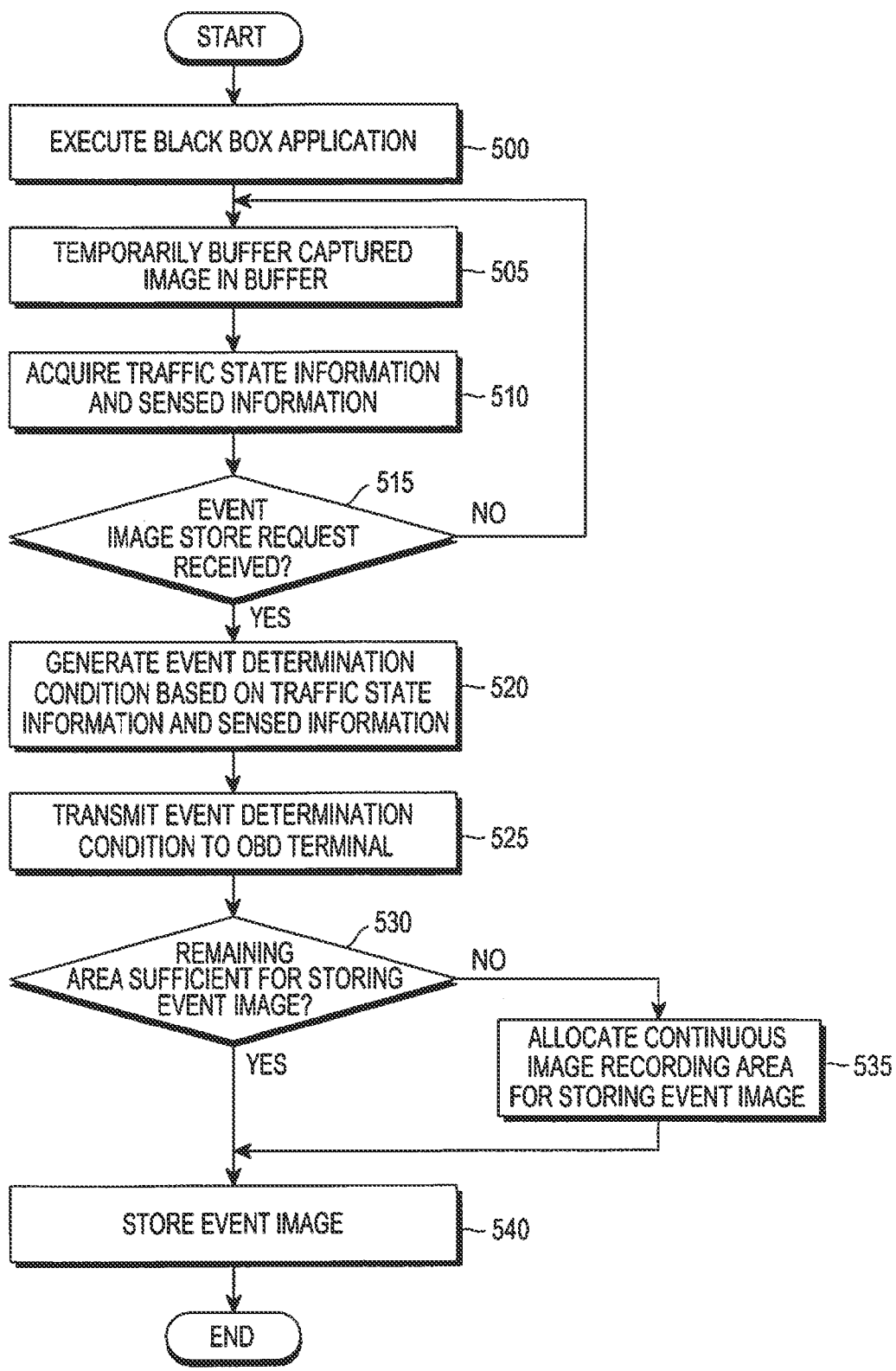
FIG. 5 is a flowchart illustrating an operation of a mobile terminal according to an embodiment of the present invention.

FIG. 5 is a flowchart illustrating an operation of a mobile terminal according to an embodiment of the present invention.

Referring to FIG. 5, when a user executes a black box application, the mobile terminal 100 captures an interior and/or exterior of the vehicle 130 through the image input unit 200 in step 500. In step 505, the captured image is temporarily buffered in the buffer. While capturing the image, in step 510, the mobile terminal 100 senses a value using the sensor unit and acquires GPS information and acquires traffic state information.

Upon receipt of an event image store request from the OBD terminal 120 in step 515, the mobile terminal 100 generates an event determination condition based on the acquired traffic state information and sensed information in step 520. In step 525, the mobile terminal 100 notifies the OBD terminal 120 of the event determination condition. In step 530, the mobile terminal 100 determines whether the remaining area is sufficient for storing an event image. In the absence of a sufficient remaining area in step 530, the mobile terminal 100 allocates a continuous image recording area as an event image recording area in step 535 and stores the event image in the allocated area in step 540. When there is sufficient remaining area, the mobile terminal 100 stores the event image in the remaining area in step 540. Specifically, the mobile terminal 100 stores the vehicle state information received along with the event image store request from the OBD terminal 120 together with the event image.

While an acquisition of traffic state information and sensed information precedes reception of an event image store request in FIG. 5, it may be further contemplated as another embodiment that the acquisition of traffic state information and sensed information takes place after reception of an event image store request. Likewise, the mobile terminal 100 may notify the OBD terminal 120 of an event determination condition after storing an event image.

As is apparent from the above description of the present invention, because a black box function equipped in a mobile terminal is associated with an OBD terminal, the mobile terminal can more efficiently control the black box function.

Besides a vehicle collision, information about various vehicle states is recorded with images. Therefore, a user can accurately identify a vehicle state.

Further, the mobile terminal changes an event determination criterion according to sensor measurement information and notifies the OBD terminal of the adjusted event determination criterion. Therefore, event images of an almost accident can be stored, which means that event image recording is more efficient. In the lack of an event image recording area, the event image recording area is adaptively changed to enable recording of event images.

The above-described embodiments of the present invention can also be implemented in hardware, or a combination of hardware and software. The software can be recorded to a volatile or non-volatile storage device such as a ROM irrespective of deletable or re-recordable, to a memory such as a RAM, a memory chip, a memory device, or an integrated circuit, or to a storage medium that is optically or magnetically recordable and readable by a machine (e.g., a computer), such as a Compact Disc (CD), a Digital Versatile Disc (DVD), a magnetic disk, or a magnetic tape. The storage included in the host device is an example of a machine-readable storage medium suitable for storing a program or programs including instructions to implement the embodiments of the present invention. Accordingly, an embodiment of the present invention includes a program including a code for implementing the apparatus or method as appended in the claims and a machine-readable storage medium that stores the program. The program may be transferred electronically through any medium such as a communication signal transmitted through a wired or wireless connection and the present invention embraces equivalents thereof.

In addition, the mobile terminal can receive and store the program from a program providing device connected to the host device wirelessly or by cable. The program providing device may include a program with instructions that make the mobile terminal perform the method for recording an image for a vehicle using OBD information, a memory for storing information for the method, a communication unit for conducting a wired or wireless communication with the mobile terminal, and a controller for transmitting the program to the mobile terminal upon request of the mobile terminal or automatically.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A mobile terminal for recording an image from a vehicle using On Board Diagnostic (OBD) information, the mobile terminal comprising:
   an interface unit configured to receive state information about the vehicle from an OBD terminal provided in the vehicle;
   a sensor unit configured to sense movement of the vehicle;
   an image input unit configured to capture images related to vehicle driving;
   a memory configured to store the captured images and vehicle state information related to an occurrence of an event;
   a controller configured to store the captured images through the image input unit in the memory, when a value received from the sensor unit that is greater than or equal to a predetermined threshold or the vehicle state information related to an occurrence of an event is received from the OBD terminal, and to store the vehicle state information in the memory, when the vehicle state information is received; and
   a display configured to display the captured images and the vehicle state information.

2. The mobile terminal of claim 1, wherein the memory stores the captured images for a predetermined time before and after the event.

3. The mobile terminal of claim 1, wherein the sensor unit senses at least one of a speed, a shock, a vibration, and a direction of the vehicle.

4. The mobile terminal of claim 1, wherein the captured image includes an image of an interior or exterior of the vehicle.

5. The mobile terminal of claim 1, wherein the vehicle state information includes at least one of acceleration information, deceleration information, engine overheating information, Engine Control Unit (ECU) defect information, a speed, a Revolutions Per Minute (RPM), a brake signal, accelerator state information, transmission information, and a vehicle defect code.

6. The mobile terminal of claim 1, further comprising a Global Positioning System (GPS) receiver that receives location information about the vehicle.

7. The mobile terminal of claim 6, wherein the controller controls storing the location information about the vehicle with the captured images.

8. The mobile terminal of claim 1, wherein the controller adjusts the predetermined threshold based on the vehicle state information.

9. The mobile terminal of claim 1, wherein when a remaining memory capacity for storing the captured image is less than or equal to a memory threshold, the controller allocates a portion of an area normally reserved for storing an image related to vehicle driving as an area for storing the captured images.

10. A method for recording an image from a vehicle using On Board Diagnostic (OBD) information in a mobile terminal, the method comprising:
    capturing an interior or exterior image of the vehicle with the mobile terminal, upon execution of a black box application installed in the mobile terminal;
    storing the captured images, when a value received from a sensor unit of the mobile terminal is greater than or equal to a predetermined threshold or vehicle state information related to an occurrence of an event is received from an OBD terminal;
    storing the vehicle state information when the vehicle state information is received;
    displaying the captured images and the vehicle state information.

11. The method of claim 10, wherein the value includes sensed values of at least one of a speed, a shock, a vibration, and a direction of the vehicle.

12. The method of claim 10, wherein the vehicle state information includes at least one of acceleration information, deceleration information, engine overheating information, Engine Control Unit (ECU) defect information, a speed, a Revolutions Per Minute (RPM), a brake signal, accelerator state information, transmission information, and a vehicle defect code.

13. The method of claim 10, wherein storing the captured images comprises:
    receiving location information about the vehicle; and
    storing the location information about the vehicle with the captured images.

14. The method of claim 10, further comprising:
    receiving the vehicle state information from the OBD terminal provided in the vehicle; and
    adjusting the predetermined threshold based on the vehicle state information.

15. The method of claim 10, further comprising allocating portion of an area normally reserved for storing an image related to vehicle driving as an area for storing the captured images, when a remaining memory capacity for storing the captured images is less than or equal to a memory threshold.

* * * * *